United States Patent [19]

Weller

[11] Patent Number: 4,696,225
[45] Date of Patent: Sep. 29, 1987

[54] AIR FILTER ARRANGEMENT FOR VEHICLE AIR-CONDITIONING SYSTEM

[75] Inventor: Karl-Heinz R. Weller, Gerlingen, Fed. Rep. of Germany

[73] Assignee: Daimler-Benz Aktiengesellschaft, Fed. Rep. of Germany

[21] Appl. No.: 871,790

[22] Filed: Jun. 9, 1986

[30] Foreign Application Priority Data

Jun. 7, 1985 [DE] Fed. Rep. of Germany ....... 3520413

[51] Int. Cl.⁴ ............................................. B60H 3/06
[52] U.S. Cl. ........................................ 98/2.11; 55/303
[58] Field of Search ...................... 98/2.11, 2.06, 2.07; 55/301, 303, 283

[56] References Cited

U.S. PATENT DOCUMENTS

| | | | |
|---|---|---|---|
| 2,796,820 | 6/1957 | Moore et al. | 98/2.11 X |
| 3,027,865 | 4/1962 | Kautz et al. | 55/274 X |
| 3,887,341 | 6/1975 | Sutter | 55/303 X |
| 3,905,785 | 9/1975 | Fabre | 55/303 X |
| 4,215,817 | 8/1980 | Delaporte | 55/303 X |
| 4,364,749 | 12/1982 | Dunseith | 55/303 X |
| 4,378,979 | 4/1983 | Dunseith | 55/303 X |
| 4,610,138 | 9/1986 | Shinzawa et al. | 55/283 X |

*Primary Examiner*—William E. Tapolcai

[57] ABSTRACT

In order to achieve an effective cleaning of the filter in the case of a heating or air-conditioning system of a motor vehicle without having to change the rotating direction of the fan, the fan is installed in the incoming-air flow downstream of the air filter device. Behind the fan, at least one blocking member is arranged that prevents the entrance of air from the fan to the passenger space during the cleaning phase and instead causes the conveyed air to flow out from the fan housing in the direction of the air filter device.

23 Claims, 8 Drawing Figures

AIR FILTER ARRANGEMENT FOR VEHICLE AIR-CONDITIONING SYSTEM

BACKGROUND AND SUMMARY OF THE INVENTION

This invention relates to an air filter device arranged in the incoming air flow path of a heating or air-conditioning system of a motor vehicle. When the air flow direction is reversed, the air filter device, which has an assigned fan, is acted upon for the cleaning of the air filter device.

A device of this type in which the fan is arranged in the incoming air flow in front of the air filter device is known from DE-OS No. 30 04 675. In order to clean the air filter device, it is necessary to reverse the rotating direction of the fan, resulting in relatively high costs with respect to wiring technology and increased difficulty in the operation of the device.

It is an objective of the invention to achieve an effective cleaning of the air filter device without reversing the rotational direction of the fan by providing a simple flap construction and arrangement of the wiring.

This objective is achieved by providing an air filter device that is supported by a fan, whereby the fan is placed downstream of the filter with respect to the incoming air flow and whereby at least one flow altering arrangement is positioned downstream of the fan. In this case, the air filter device may consist of a screen that is arranged on the air inlet side and holds back major direct particles, in addition to a filter that is arranged behind it and also separates fine dust. This filter may also contain a filter section, for example, with an activated-carbon filling, that retains toxic substances, substances having a bad odor and other harmful substances.

In one preferred embodiment of the invention, the flow altering arrangement includes a blocking element that is developed as a two-wing flap that is arranged upstream of the heat exchanger surfaces and which selectively blocks and unblocks the fan air flow to the heat exchanger surfaces and to the air filter device. The other wing of the two-wing flap alternately blocks or unblocks an opening to the passenger space.

In another preferred embodiment of the invention, the flow altering arrangement includes a blocking element that is arranged in each duct leading to side nozzles.

The point in time for introducing the cleaning process can be determined by detecting the changing pressure loss values across the air filter device. When a predetermined value is reached, an electrical and/or acoustical signal is triggered.

In another preferred embodiment of the invention, a sensor is arranged downstream of the air filter device that, in the case of a predetermined intensity of a harmful and/or bad-odor substance, triggers an electrical and/or acoustical signal.

According to this preferred embodiment, the signal can be used for the automatic starting of the cleaning phase.

A more intensive cleaning by highly heated air is effected when the signal is not triggered until the cooling water temperature is about 80° C.

According to another preferred embodiment of the invention, a cleaning phase is introduced before the start of the driving or after the end of the driving. According to this preferred embodiment, which can be realized at very low cost, the cleaning phase is introduced independently of the amount of pressure loss and/or of the harmful substance concentration of the air filter device.

Other objects, advantages and novel features of the present invention will become apparent from the following detailed description of the invention when considered in conjunction with the accompanying drawings.

DETAILED DESCRIPTION OF THE DRAWINGS

Figure 1:
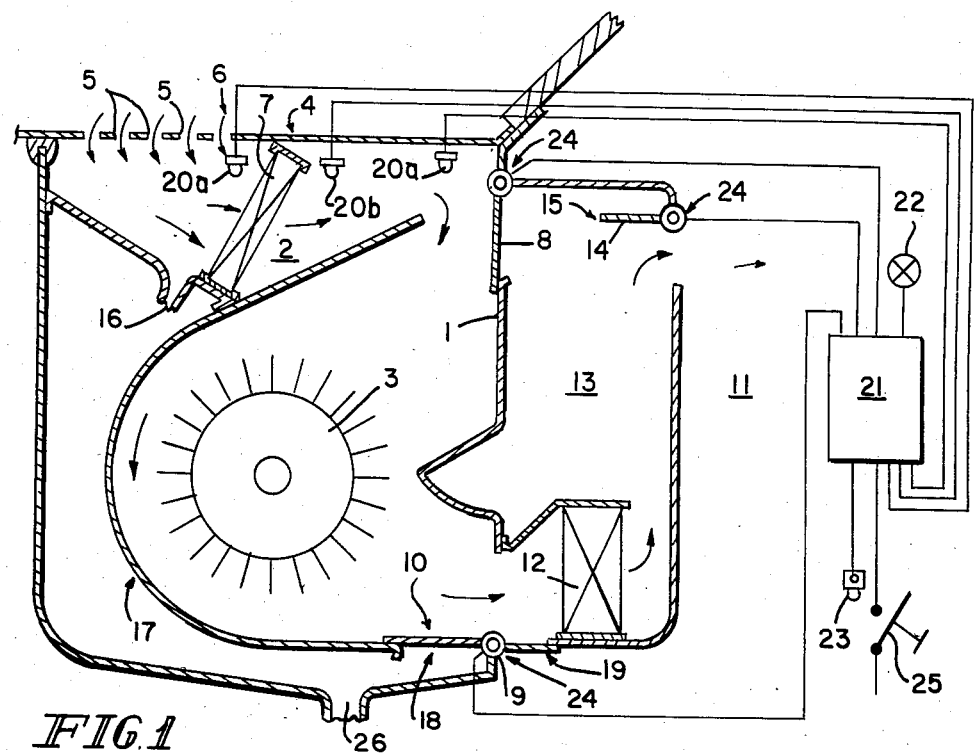
FIG. 1 is a first heating and ventilating system during filtering that is equipped with an air filter device.
Figure 2:
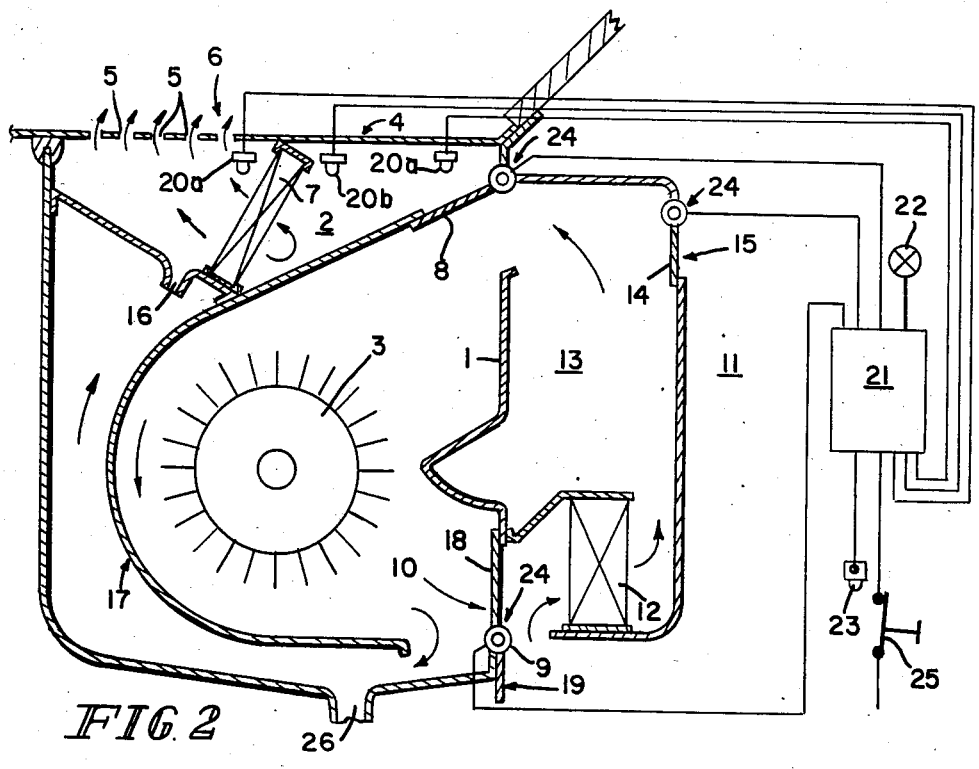
FIG. 2 is the system according to FIG. 1 during a cleaning phase and including the return flaw of heated air.

According to FIGS. 1 and 2, a fan 3 is fixed in a water diverting space 2 arranged in front of the front wall 1 of a motor vehicle that is not shown, the fan 3 being covered by a pivotably coupled hood 4. An air screen 5 that forms one part of an air filter device 6 is embedded in the hood 4. The other part of the filter device 6 consists of an exchangeable filter cassette 7 that is mounted behind said air screen 5.

A first blocking element 8 that is developed as a kind of fresh-air/circulating-air flap and a second blocking element 10 forming a two-wing flap 9 are pivotably disposed at the front wall 1. An air-distributing space 13 having at least one heat exchanger surface 12 is assigned to the passenger space 11, air being guided to the passenger space 11. In the filtering phase shown in FIG. 1, air guided from said air-distributing space 13 to the passenger space 11 by means of the opening of a third blocking element 15 that is developed as a flap 14.

In the fresh-air operation according to FIG. 1, outside air flows through the air screen 5, in which case larger foreign particles, such as leaves, hailstones, etc. are kept back. Subsequently, the air flow is largely dehumidified and passes through the filter cassette 7, while the separated liquid, can exit in the direction of the fan housing 17 through a drain 16. The blocking element 8 covers an assigned opening of the front wall 1, so that air enters into the fan 3.

The two-wing flap 9 is in a position in which one of its wings 18 unblocks the transition opening in the front wall 1 in the direction of the heat exchanger surface 12 and in which its other wing 19 blocks an assigned lower opening in the direction of the passenger space 11. The air therefore flows through the heat exchanger surface 12 and exits into the air-distributing space 13. Since the flap 14 is pivoted in upward direction, the air is discharged through nozzles that are mounted behind and are not shown, in the direction of the passenger space 11.

Since the filtering effect diminishes after a while, it is necessary to clean the filter cassette 7 as well as the air screen by an opposed air flow. The necessary point in time to clean the air filter may be determined by the arrangement of pressure sensors 20a in the space 2 in front and behind the filter cassette 7, whereby the pressure loss is detected and is processed in an electronic device 21. When the pressure differential reaches a predetermined value in the case of an indicated fan stage, a signal and/or a visual or acoustial report 22 is advantageously triggered when the temperature of the cooling water detected by a temperature emitter 23 is about 80° C.

A cleaning phase of the air filter device 6 will also be required when the amount of toxic substances, bad-odor and harmful substances introduced to the filter exceeds a predetermined value. In order to prevent a creeping desorption of the filter and the entry of particles into the inside of the vehicle, a sensor 20b is arranged behind the filter cassette 7 that absorbs the concentration of harmful substances and leads it to the electronic device 21. When an indicated maximum value is exceeded, a signal is triggered which can also activate a report.

Adjusting elements 24 are assigned to the blocking elements 8, 10 and 15 which automatically, or by actuating a switch 25, changes the blocking elements 8, 10 and 15 in the position shown in FIG. 2. When an evaluated signal is present, indicating of a required cleaning point into time, either. In a manner that is not shown, it is also contemplated to carry out a cleaning phase before the start of the drive or after the end of the drive which is, for example, controlled by the ignition key.

As shown in FIG. 2, during the cleaning phase, air from the inside passenger space, enters on the bottom side of the air distributing space 13. The air is then advantageously brought to a higher temperature by means of the heat exchanger surface 12 mounted behind it and then enters the fan 3 that is moving at a high speed but is not reversed with respect to rotating direction. The air leaves the fan housing 17 on the bottom side and will then reach the rear side of the filter cassette 7 via the side channels 2, which as can be seen in the plan FIGS. 6 and 8, extend around the periphery of the fan 3 and provide a lateral opening into the duct leading from the backside of filter cassette.

By means of the air flow that is directed in the reverse direction, connected with the high temperature of the air that is flowing through, an intensive cleaning of the filter material takes place, in which case detaching particles separate either between the filter casette 7 and the air screen 5 or are transported to the outside by it. Moisture entering through the air screen 5, for example, when the car is being washed, binds the separated particles and transports them to the outside via the drain 16 and via another drain opening 26 arranged on the bottom side of the assembly space. The two draining elements are equipped with sealing lips at the end sides that prevent a return flow in a way that is known per se but is not shown.

Figure 3:
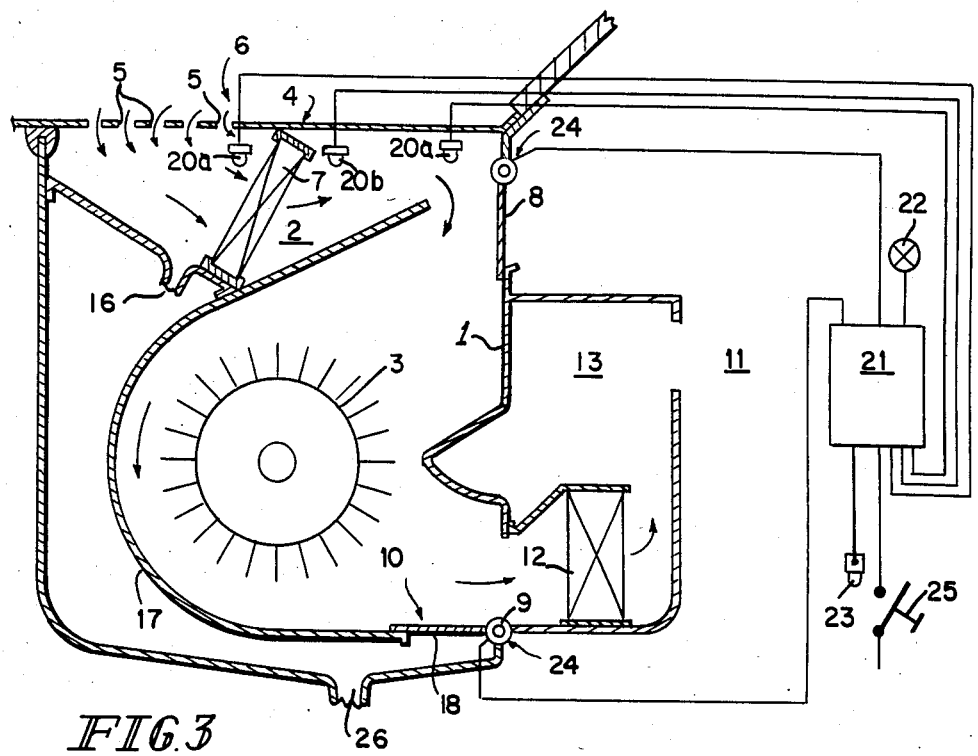
FIG. 3 is an embodiment of the filtering operation that is simplified with respect to FIG. 1.
Figure 4:
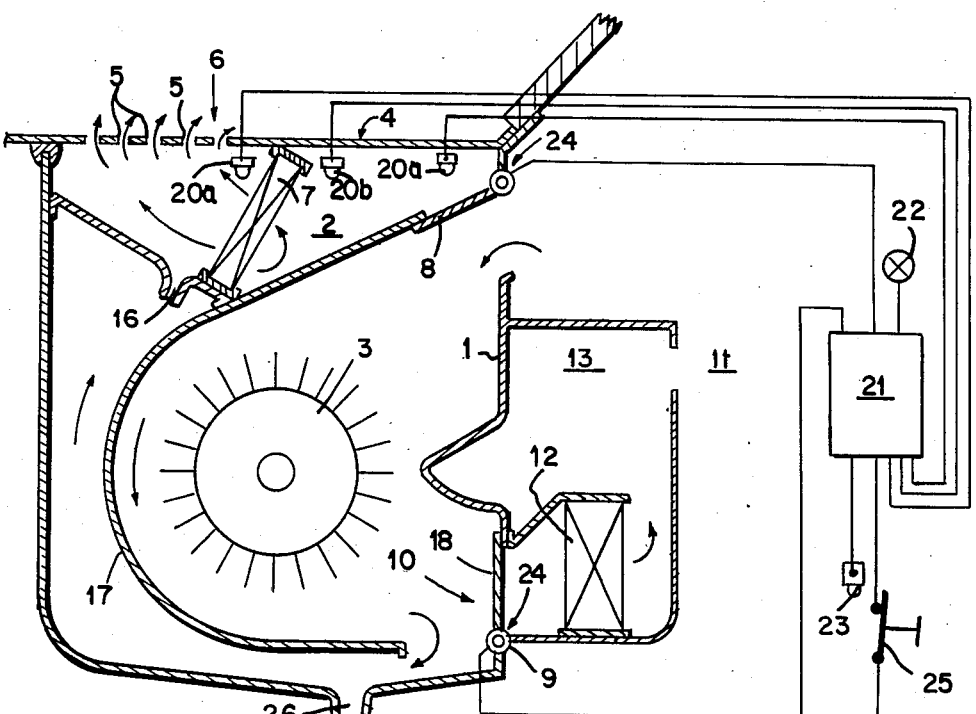
FIG. 4 is the system according to FIG. 3 during the cleaning operation where the air of the inside space is not heated.

In another preferred embodiment of the invention, shown in FIGS. 3 and 4, the air-distributing space 13 cannot be blocked with respect to the passenger space 11, and the blocking element 10 has only one wing 18. The filtering operation according to FIG. 3 of this embodiment corresponds to the same method of operation of the more costly embodiment according to FIG. 1.

In the case of the cleaning phase according to FIG. 4, the air from the inside passenger space is sucked in directly to the fan and the air is not heated. Otherwise, the course of the flow corresponds to that of FIG. 2.

Figure 5:
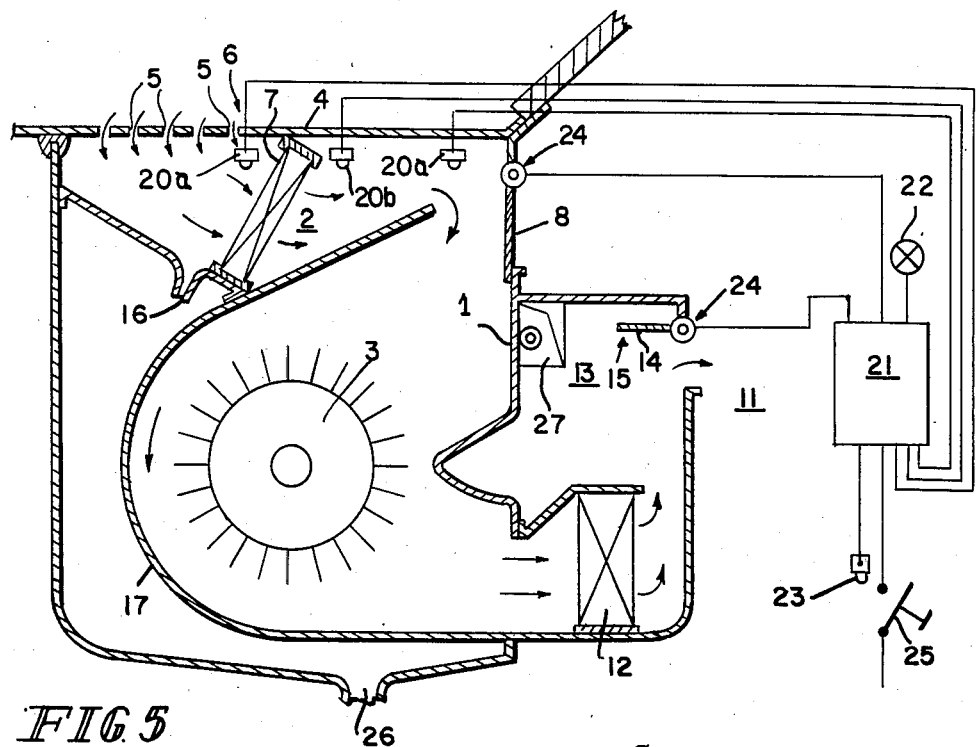
FIG. 5 is the lateral view of the section of another embodiment having blockable ducts that lead off from the air distributing space to lateral nozzles, in the filtering operation.
Figure 6:
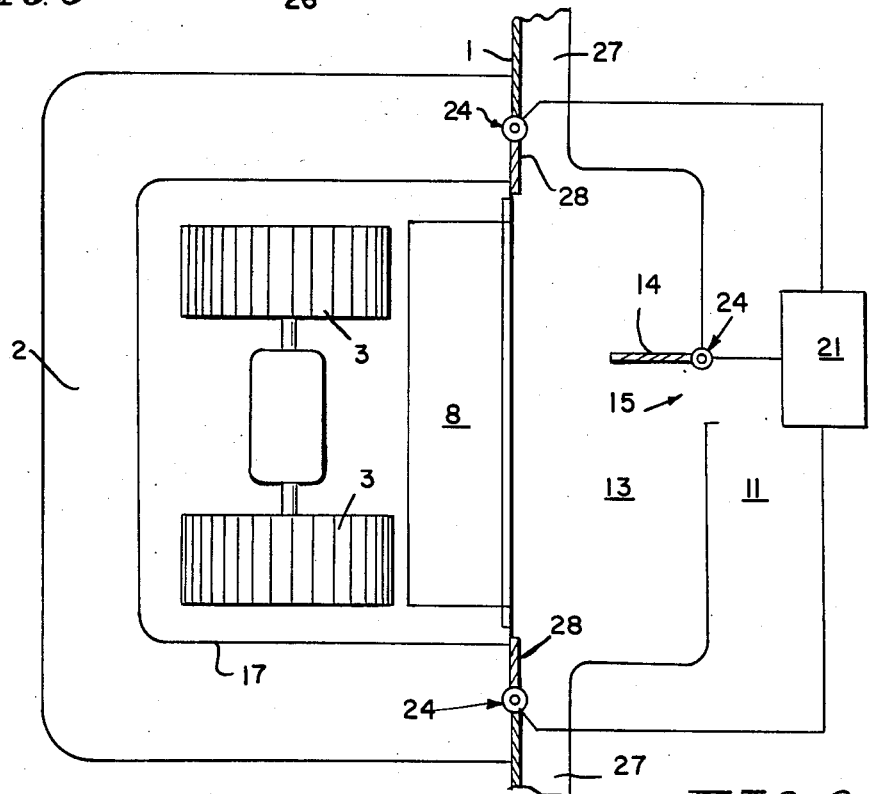
FIG. 6 is a sectional top view of FIG. 5.

According to FIGS. 5 to 8, a duct 27 is connected at both sides of the air distributing space 13 that leads to lateral air outlet nozzles that are not shown. The duct 27 is blockable in each case by means of adjusting element 24 that is developed as a flap 28. During the filtering operation, as it is shown in FIGS. 5 and 6, the blocking element 8 rests against the front wall 1 and covers an assigned opening. The air that flows through the filter cassette 7 is guided by means of the fan 3, to the air distributing space 13. The air also moves into the ducts 27 because each of the flaps 28 blocks the path to the space 2.

Figure 7:
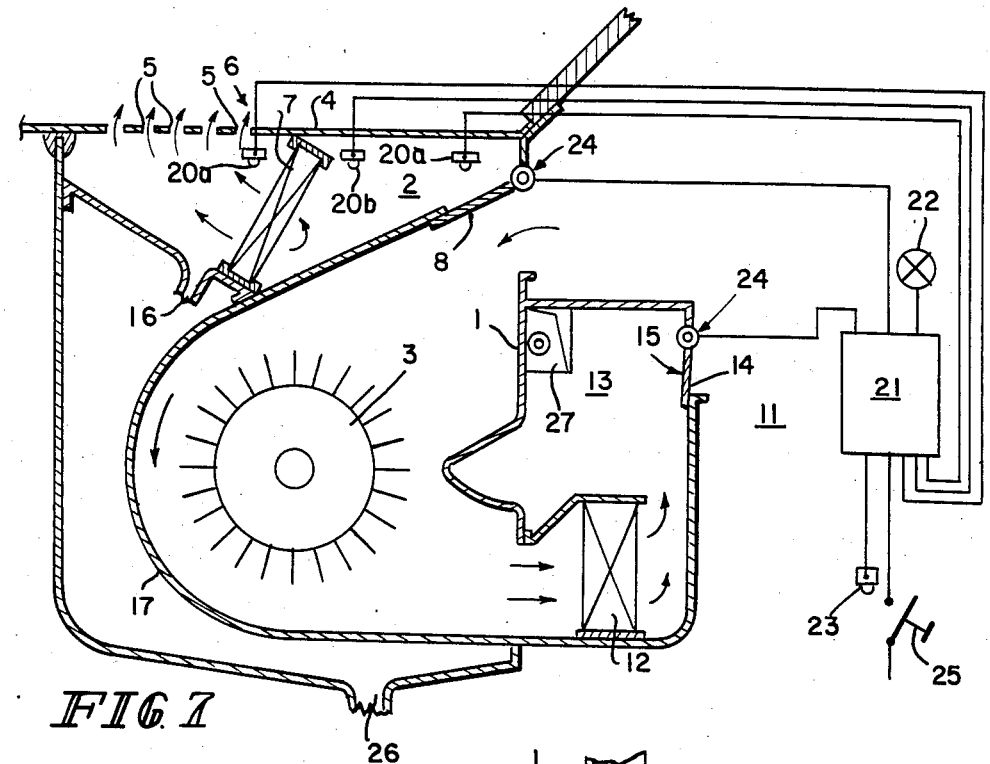
FIG. 7 is the arrangement according to FIG. 5 during a cleaning phase.
Figure 8:
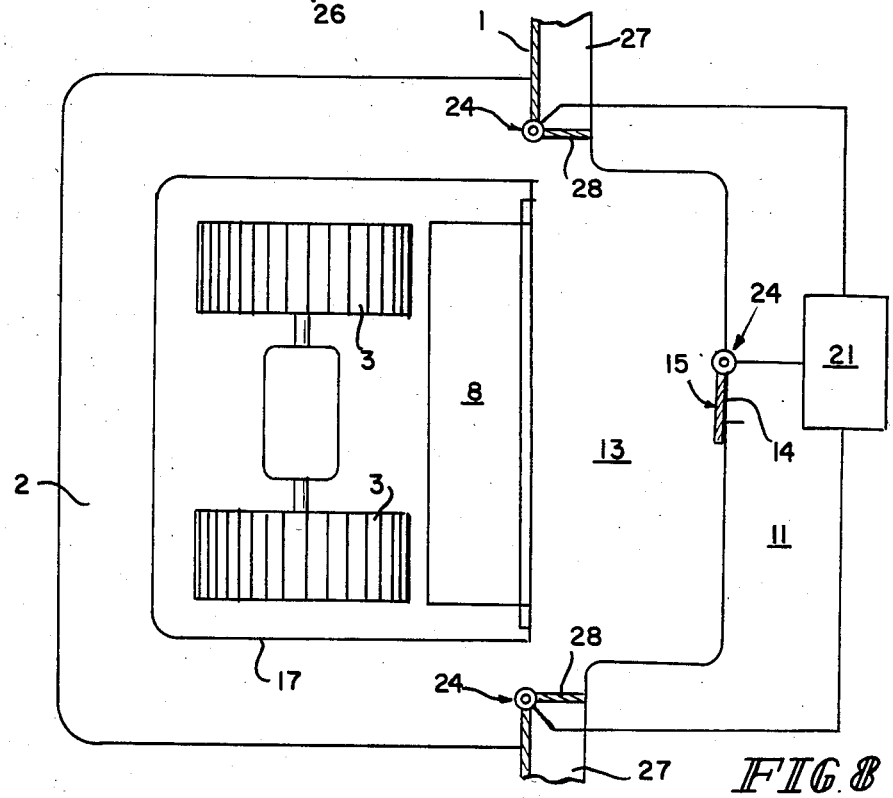
FIG. 8 is a sectional top view of FIG. 7.

It is only when the cleaning phase is introduced, in which case the blocking element 8 prevents an entering of fresh air as shown in FIGS. 7 and 8, that the flaps 28 are reversed and will now unblock the path to the space 2. As described above, the air will then flow through the filter cassette 7 and the air screen 5 to the outside against the normal direction, in which case a cleaning effect takes place.

I claim:

1. An air filter arrangement for a heating or air conditioning system of a motor vehicle comprising:
    filter means arranged in an air inlet flow means between the outside of the vehicle and the passenger space of the vehicle;
    fan means arranged behind the filter means in the direction of the passenger space of the vehicle; and
    flow altering means for altering the air flow path;
    wherein, during normal operation, the flow altering means are arranged so as to cause air flow from the outside of the vehicle, through the inlet flow means, filter means, to an inlet of the fan means and into the passenger space, and during an air filter cleaning operation, the flow altering means are arranged so as to cause air flow from the passenger spaced through the inlet of the fan means, the inlet flow means and the filter means to the outside of the vehicle.

2. An air filter arrangement according to claim 1, wherein the flow altering means comprises at least one blocking element which opens and closes to alter the air flow.

3. An air filter arrangement according to claim 2, wherein at least one of the blocking elements is arranged behind the fan means in the direction of the passenger space.

4. An air filter arrangement according to claim 2, wherein the flow altering means includes first and second blocking elements.

5. An air filter arrangement according to claim 4, wherein during normal operation, the first blocking element permits air flow from the outside of the vehicle through the inlet flow means into the inlet of the fan means, and wherein during the cleaning operation, the first blocking element blocks air flow from the outside of the vehicle into the inlet of the fan means.

6. An air filter arrangement according to claim 5, wherein the second blocking element is positioned behind the fan means in the direction of the passenger space, and wherein during normal operation the second blocking element causes air to flow into the passenger spaced, and wherein during the cleaning operation the second blocking element blocks flow to the passenger space and causes air to flow to the filter means and then to the outside of the vehicle.

7. An air filter arrangement according to claim 6, further comprising a heat exchanger means, wherein the second blocking element causes air to flow from the fan means to the heat exchanger means and then to the passenger space during normal operation and wherein the second blocking element causes air to flow from the fan means to the air filter means and then to the outside of the vehicle during the cleaning operation.

8. An air filter arrangement according to claim 7, wherein the second blocking element causes air to flow from the passenger space to the heat exchanger means during the cleaning operation.

9. An air filter according to claim 2, further comprising an air distributing space means positioned between the fan means and the passenger space, said air distributing space means including duct means for connecting said air distributing space with air outlet nozzles.

10. An air filter according to claim 9, wherein at least one of the blocking elements is arranged in the duct means for permitting air to flow from the fan means to the duct means.

11. An air filter according to claim 8, further comprising an air distributing space means positioned between the fan means and the passenger space, said air distributing space means including duct means for connecting air distributing space with air outlet nozzles.

12. An air filter according to claim 11, wherein at least one of the blocking elements is arranged in the duct means for causing air to flow from the fan means to the duct means.

13. An air filter according to claim 1, further comprising detecting means for detecting the pressure loss as air travels through the filter means, wherein when the pressure loss reached at a predetermined value the detecting means triggers a signal means which initiates the cleaning operation by activating the flow altering means.

14. An air filter according to claim 13, wherein said signal means comprises an electrical signal.

15. An air filter according to claim 13, wherein said signal comprises an acoustical signal.

16. An air filter according to claim 10, further comprising a sensor means positioned behind the filter means in the direction of the passenger space for detecting the intensity of harmful substances or harmful odors, wherein when the intensity reaches a predetermined value the sensor means triggers a signal means which initiates the cleaning operation by activating the flow altering means.

17. An air filter according to claim 16, wherein said signal means comprises an electrical signal.

18. An air filter according to claim 16, wherein said signal comprises an acoustical signal.

19. An air filter according to claim 13, wherein the signal means will not be triggered until the cooling water temperature is approximately 80° C.

20. An air filter according to claim 16, wherein the signal means will be triggered until the cooling water temperature is approximately 80° C.

21. An air filter according to claim 8, wherein there is provided initiating means for initiating the cleaning operation before or after the motor vehicle is in operation, such that the cleaning phase is initiated irrespective of the amount of pressure loss across the filter means or the concentration of harmful substances traveling through the filter means.

22. An air filter according to claim 8, wherein said second blocking element is developed as a two-wing flap.

23. An air filter according to claim 5, wherein said first blocking element is developed as a single-wing flap.

* * * * *